US012807122B2

(12) United States Patent
Hurst et al.

(10) Patent No.: US 12,807,122 B2
(45) Date of Patent: Nov. 24, 2026

(54) SYSTEM AND METHOD FOR IDENTIFYING EVENT SOURCE LOCATION ALONG VEHICLE SYSTEM

(71) Applicant: Transportation IP Holdings, LLC, Norwalk, CT (US)

(72) Inventors: Ryan Hurst, Kansas City, MO (US); Jason Quigley, Erie, PA (US); David Schroeck, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 125 days.

(21) Appl. No.: 18/499,628

(22) Filed: Nov. 1, 2023

(65) Prior Publication Data

US 2024/0198997 A1 Jun. 20, 2024

Related U.S. Application Data

(60) Provisional application No. 63/387,804, filed on Dec. 16, 2022.

(51) Int. Cl.
*B60T 17/22* (2006.01)
*B60T 8/17* (2006.01)
*B60T 13/66* (2006.01)
*B61L 15/00* (2006.01)

(52) U.S. Cl.
CPC .......... *B60T 17/228* (2013.01); *B60T 8/1705* (2013.01); *B60T 13/665* (2013.01); *B61L 15/0018* (2013.01); *B61L 15/0081* (2013.01)

(58) Field of Classification Search
CPC .... B60T 17/228; B60T 8/1705; B60T 13/665; B61L 15/0018; B61L 15/0081
See application file for complete search history.

(56) References Cited

U.S. PATENT DOCUMENTS

| | | | | |
|---|---|---|---|---|
| 11,938,937 B2 * | 3/2024 | Gaughan | ............... | B60W 30/16 |
| 2021/0179054 A1 * | 6/2021 | Wright | .................. | B60T 17/228 |
| 2021/0237696 A1 * | 8/2021 | Kumar | .................. | B60T 13/665 |
| 2021/0276526 A1 * | 9/2021 | Gaughan | ............... | B60T 17/228 |
| 2022/0169249 A1 * | 6/2022 | Gaughan | ................. | B60T 17/22 |

FOREIGN PATENT DOCUMENTS

WO 2021178576 A1 9/2021

OTHER PUBLICATIONS

European Search Report for corresponding European Patent Application No. 23215216 dated Apr. 18, 2024.

* cited by examiner

*Primary Examiner* — Lindsay M Low
*Assistant Examiner* — Susan E Scharpf
(74) *Attorney, Agent, or Firm* — K&L Gates LLP

(57) ABSTRACT

A system and method include receiver assemblies disposed onboard a vehicle system and spaced apart from each other along a length of the vehicle system. The receiver assemblies are configured to receive a signal responsive to an event occurring on the vehicle system between the receiver assemblies, and to determine times at which the receiver assemblies received the signal. A controller is configured to identify a section of the vehicle system that includes a source of the event based on the times at which the receiver assemblies received the signal and a distance between at least two of the receiver assemblies.

12 Claims, 3 Drawing Sheets

SYSTEM AND METHOD FOR IDENTIFYING EVENT SOURCE LOCATION ALONG VEHICLE SYSTEM

CROSS-REFERENCE TO RELATED APPLICATIONS

This application is a non-provisional conversion of, and claims priority to, U.S. Provisional Patent Application No. 63/387,804, which was filed on Dec. 16, 2022, and the entire disclosure of which is incorporated herein by reference.

BACKGROUND

Technical Field

The subject matter described herein relates to identifying a section of a vehicle system that includes an event source based on time-of-flight signal propagation between multiple receiver assemblies onboard the vehicle system.

Discussion of Art

Some vehicle systems include multiple vehicles and extend relatively long lengths from a leading end of the vehicle system to a trailing end of the vehicle system. An event may occur at an intermediate location of the vehicle system that requires intervention, such as repair or replacement of a component. For example, some events may cause an unplanned (e.g., emergency) brake application of the vehicle system. The vehicle system may slow to a stop until the cause of the event can be identified and repaired. On long vehicle systems, it may be difficult to identify the source or root cause of the event. For example, the source could be a leak at a single location of a brake pipe that extends an entirety or at least a majority of the length of the vehicle system, a faulty brake valve of hundreds of brake valves on the vehicle system, or the like.

A known method for identifying a defective component that triggers a vehicle-wide event include crew members walking the length of the vehicle system to inspect and search for the defective component. This is a time-consuming process, especially considering that vehicle systems can extend lengths that exceed 10,000 ft and can include hundreds of individual vehicles. During this manual inspection process, the vehicle system may be stationary and may occupy a route that is traversed by other vehicle systems. The delay attributable to the inspection may cause the vehicle system to miss a planned arrival time at a destination, and/or may impede the throughput of other vehicle systems on the network, interfering with the schedules of the other vehicle systems. It may be desirable to have a control system and method that differs from those that are currently available.

BRIEF DESCRIPTION

In one or more embodiments, a system (e.g., a location determining system) is provided that includes receiver assemblies and a controller. The receiver assemblies are configured to be disposed onboard a vehicle system and spaced apart from each other along a length of the vehicle system. The receiver assemblies are configured to receive a signal responsive to an event occurring on the vehicle system between the receiver assemblies, and to determine times at which the receiver assemblies received the signal. The controller is configured to identify a section of the vehicle system that includes a source of the event based on the times at which the receiver assemblies received the signal and a distance between at least two of the receiver assemblies.

In one or more embodiments, a method (e.g., for determining an event source location) is provided that includes receiving a signal at spaced apart receiver assemblies disposed onboard a vehicle system. The signal is received responsive to an event occurring on the vehicle system between the receiver assemblies. The method includes determining times at which the receiver assemblies received the signal, and identifying a section of the vehicle system that includes a source of the event based on the times at which the receiver assemblies received the signal and a distance between at least two of the receiver assemblies.

In one or more embodiments, a system (e.g., a location determining system) is provided that includes receiver assemblies and a controller. The receiver assemblies are configured to be disposed onboard different vehicles of a multi-vehicle system having a brake system. The receiver assemblies are configured to receive one or more of a pneumatic signal or an electromagnetic signal indicative of a pressure change event of the brake system. Each of the receiver assemblies is configured to determine a respective time at which the one or more of the pneumatic signal or the electromagnetic signal is received by the receiver assembly. The controller is configured to identify a location of the pressure change event in the brake system based on the respective times at which the receiver assemblies received the one or more of the pneumatic signal or the electromagnetic signal and based on a distance between the receiver assemblies.

BRIEF DESCRIPTION OF THE DRAWINGS

The inventive subject matter may be understood from reading the following description of non-limiting embodiments, with reference to the attached drawings, wherein.

DETAILED DESCRIPTION

Figure 1:
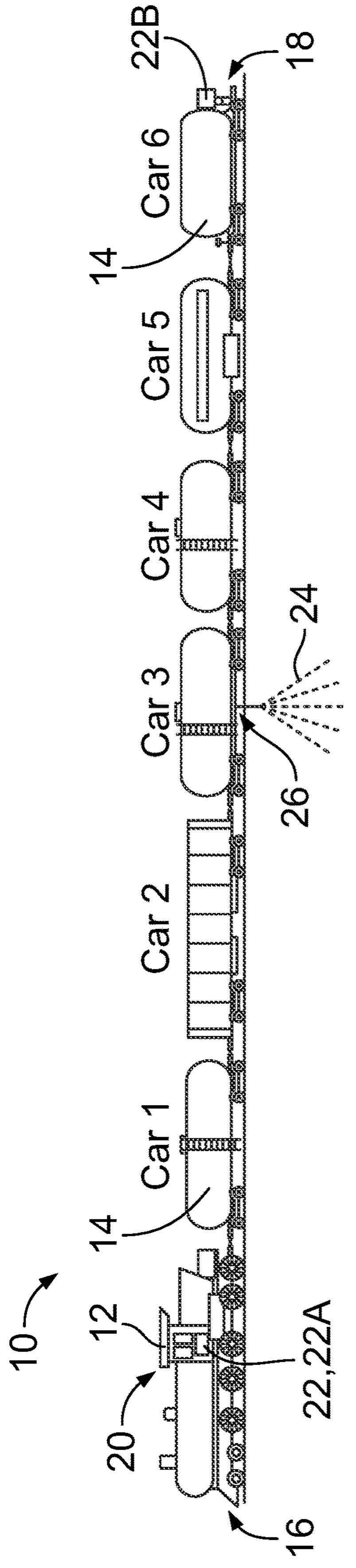
FIG. 1 illustrates a vehicle system that incorporates a location determining system according to an embodiment.

Embodiments of the subject matter described herein provide a location determining system and method for determining an onboard location of an event root cause along a length of a vehicle system. The location determining system includes multiple receiver assemblies at different locations along the length of the vehicle system. The location determining system may identify a section, along the length of the vehicle system, at which a root cause or source of an event is located based on signal propagation times and distance between at least two of the receiver assemblies. For example, the section may be identified based on the times at which first and second receiver assemblies receive a signal responsive to the event and the distance between the first and second receiver assemblies. The location determining system and method may then take one or more control operations based on that identified location of the root cause. For example, the system may notify an operator the identified location which enables the crew to narrow the scope of the inspection process. For example, the crew that inspects the vehicle system to search for a defect that causes the event would initially focus attention on the identified section, without inspecting one or more other segments of the vehicle system along the way to the identified section.

This process of guiding the crew to a candidate section of the vehicle system that includes a source of the event may substantially reduce the elapsed time for the crew to find and repair the defective component(s), which enables the vehicle system to resume traveling earlier than vehicle systems that rely on non-guided manual inspections. Reducing the time that the vehicle system is stationary on the route may improve the travel efficiency of the vehicle system itself (e.g., potentially allowing the vehicle system to satisfy a scheduled arrival time), and may increase the network throughput of the transportation network by reducing the interference on the movement of other vehicle systems.

Other control operations may include implementing a differentiated brake application of the vehicle system based on the identified location of the root case. For example, the system may vary the timing and/or force of a brake application between at least a first segment of the vehicle system on one side of the identified location of the root cause and a second segment of the vehicle system on the other side of the identified location to reduce inter-vehicle forces. In another example, the system may differentiate the brake application by varying which type or types of brake systems are actuated to slow the vehicle system based on the identified location. Furthermore, the location determining system may differentiate tractive efforts of the vehicle system based on the identified location of the root cause. In another example, the system may use the identified location of the root cause along the vehicle system with information off-board the vehicle system, which can yield one or more inferences or conclusions. For example, system may compare the identified location along the vehicle system to location data of the vehicle system relative to the surrounding environment to determine a geographic location at which the event occurred. Determining the geographic location can enable a crew to inspect the route at the geographic location to make any necessary repairs to reduce the likelihood of other vehicles experiencing similar events at that geographic location.

FIG. 1 illustrates a vehicle system 10 that incorporates a location determining system 20 according to an embodiment. The vehicle system in FIG. 1 is a multi-vehicle system that includes at least one propulsion-generating vehicle 12 and at least one non-propulsion-generating vehicle 14. The non-propulsion-generating vehicles are labeled in FIG. 1 as "Car 1", "Car 2", etc. The vehicle system has a length that extends from a leading end 16 of the vehicle system to a trailing end 18 of the vehicle system. The leading end is defined by the propulsion-generating vehicle, and the trailing end is defined by one of the non-propulsion-generating vehicles (e.g., Car 6). The leading and trailing ends may be defined based on a planned direction of travel along a route, such that the leading end passes by a given location before the trailing end.

Although one propulsion-generating vehicle and six non-propulsion-generating vehicles are shown in FIG. 1, the location determining system 20 may be integrated onboard vehicle systems of varying different types of vehicles, numbers of vehicles, configurations or arrangements of vehicles, and/or the like. In the illustrated embodiment, the vehicle system is a rail vehicle system formed from a locomotive (as the propulsion-generating vehicle) and six rail cars (as the non-propulsion-generating vehicles). The rail cars may be connected to the locomotive and one another via mechanical couplers. In an alternative embodiment, the vehicle system may be formed from vehicles other than rail vehicles. For example, the vehicle system may be formed from a truck and one or more trailers, a road train defined by multiple trucks traveling together in a convoy, an off-road convoy defined by mining trucks, or the like. The location determining system described herein may be integrated onto long vehicle systems that include dozens or hundreds of vehicles extending lengths of up to or in excess of 10,000 ft between the leading and trailing ends. The vehicle system in an alternative embodiment may include multiple propulsion-generating vehicles that are communicatively connected but not mechanically connected. In another alternative embodiment, the location determining system may be integrated onto a single vehicle, such as a marine vessel or aircraft, particularly a vehicle that is relatively long.

The location determining system includes multiple receiver assemblies 22 that are disposed onboard the vehicle system and spaced apart along the length of the vehicle system. The receiver assemblies receive a signal that is responsive to an event 24 occurring on the vehicle system at a location between the receiver assemblies. The location of the event may be unknown. The receiver assemblies determine times that the receiver assemblies received the signal. Based on the times that the receiver assemblies received the signal and the distance between at least two of the receiver assemblies, the location determining system identifies a location 26 or section of the vehicle system that includes a source of the event.

The event refers to the occurrence of a condition that is unintended and undesired. The event may be associated with a defect in one or more components of the vehicle system. The event may be detected based on a sensed parameter that is outside of a designated range associated with normal, expected operating conditions. Optionally, the event may be detected based on analysis of image data, audio data, and/or the like, generated by one or more sensors. In one or more embodiments, the event may be associated with at least one brake system onboard the vehicle system that is activated to slow the vehicle system and/or retain the vehicle system in a stationary position. For example, the event may be a pressure change event of a pneumatic (e.g., air) brake system. In FIG. 1, the event may be a leak in a conduit of a brake system, which causes a pressure change in the brake system. The source of the leak in FIG. 1 is located on the third non-propulsion-generating vehicle (e.g., Car 3) of the vehicle system. For example, the conduit may be part of a brake pipe that continuously extends from vehicle to vehicle along a length of the vehicle system. The conduit may be a tube, pipe, hose, or the like. The leak may unexpectedly and undesirably cause a pressure change, such as pressure reduction, in the conduit because the pressure change was not commanded by a human operator or autopilot control system.

The leak may cause an unplanned (e.g., emergency) brake application. The unplanned brake application may include engagement of a brake device that was not manually implemented (e.g., by moving a lever or handle, pressing a button, flipping a switch, pressing a pedal, etc.) or automatically implemented by a system (e.g., a trip planner system, positive train control system, etc.) based on location of the vehicle system on a route, proximity to a section of the route or another vehicle system, or the like. In the embodiment in which the event is a leaking brake pipe, the pressure drop in the brake pipe due to the leak may trigger the unplanned brake application.

In the illustrated embodiment, the vehicle system includes a first receiver assembly 22A on the leading vehicle of the vehicle system (e.g., the vehicle at the leading end), and a second receiver assembly 22B on the trailing vehicle of the vehicle system (e.g., the vehicle at the trailing end). The first receiver assembly is on a propulsion-generating vehicle, and the second receiver assembly is on a non-propulsion-generating vehicle in FIG. 1. The second receiver assembly may be part of an end-of-train (EOT) device that is removably coupled to the last vehicle in the vehicle system. The EOT device may monitor various characteristics of the vehicle system at the trailing end, such as the pressure in a brake pipe. The EOT device may include lights and/or audio speakers for indicating the end of the vehicle system to onlookers and other vehicle systems. In an embodiment, the location determining system may only include the two receiver assemblies 22A, 22B with one located at or proximate to (e.g., within a designated margin distance, such as 10 ft, 20 ft or the like, of) the leading end and the other at or proximate to the trailing end. The distance between the two receiver assemblies may be measured and/or estimated based on the number of vehicles disposed between the two receiver assemblies and known lengths of the individual vehicles and couplers.

In an embodiment, the location determining system may identify the location or section of the vehicle system that includes the source (or root cause) of the leak or other event even though neither of the receiver assemblies are located in that section and/or near that location. For example, the location determining system may identify the location or section based on the respective times it takes for a signal to propagate from the location or section to each of the first and second receiver assemblies, as well as the distance between the first and second receiver assemblies. In an embodiment, the system does not merely identify the section of the source based on which receiver assembly was the first to receive a signal propagating from the source. Such first-to-detect systems typically require the sensors and/or sensor assemblies to be mounted on at least half or all of the vehicles, which can be prohibitively expensive and would likely require a long service appointment to install the sensors and/or sensor assemblies. The location determining system can use as few as two receiver assemblies, and predict the location of the source based on a few parameters with greater accuracy and precision than merely determining whether the source is closed to the first receiver assembly or the second receiver assembly. For example, the system may determine that the source of the event is disposed onboard the third non-propulsion-generating vehicle (e.g., Car 3), even though neither receiver assembly is on or next to that non-propulsion-generating vehicle. The system may rely on parameters including times at which the receiver assemblies received a signal indicative of the event that propagate from the source location and the distance between the two receiver assemblies. The first-to-detect systems do not identify a candidate location of a source of a leak or other event based on the distance between two receiver assemblies onboard the vehicle system. Those systems primarily are concerned about which assembly received the signal first.

In an alternative embodiment, the two receiver assemblies may be installed on different types of vehicles than shown in FIG. 1. For example, the receiver assemblies may be disposed onboard two different propulsion-generating vehicles. The two different propulsion-generating vehicles may be communicatively connected in a distributed power arrangement such that one of the propulsion-generating vehicles communicates control settings to the other propulsion-generating vehicle for both vehicles to travel together with coordinated movements. In another alternative embodiment, the location determining system may include more than two receiver assemblies. A third receiver assembly may be disposed between the first and second receiver assemblies. For example, the third receiver assembly may be installed onboard the third or the fourth non-propulsion-generating vehicle (e.g., Car 3 or 4) in FIG. 1. Increasing the number of sensor assemblies beyond two may improve the accuracy of the location determining system to pinpoint the location of the event source, with the drawback of increased costs.

Figure 2:
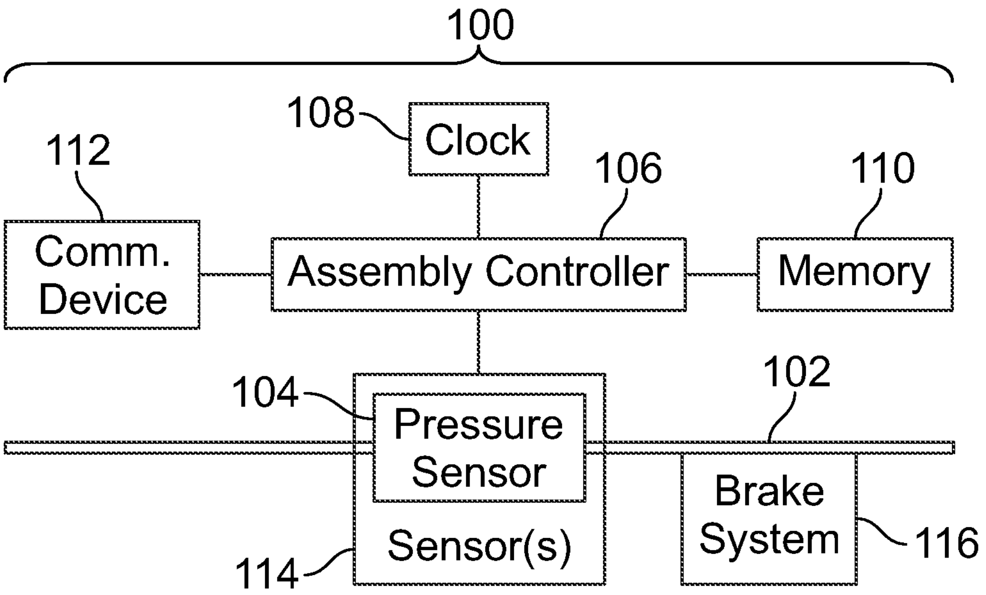
FIG. 2 is a block diagram of a receiver assembly of the location determining system according to an embodiment.

FIG. 2 is a block diagram of a receiver assembly 100 of the location determining system according to an embodiment. The receiver assembly may be integrated with a vehicle system. For example, the receiver assembly in FIG. 2 may represent the first and second receiver assemblies shown in FIG. 1. In use, the receiver assembly can monitor times at which the receiver assembly receives a signal indicative of an event onboard the vehicle system. The receiver assembly may include an assembly controller 106, a communication device 112, a tangible and non-transitory computer readable storage medium, or computer memory 110, a clock device 108, and/or one or more sensors 114. The communication device and/or a sensor are used to receive the signal indicative of the event, and the assembly controller determines the time that the signal is received by the communication device and/or sensor based on the clock device.

The assembly controller represents hardware circuitry that includes and/or is connected with one or more processors (e.g., one or more microprocessors, integrated circuits, microcontrollers, field programmable gate arrays, etc.). The assembly controller may represent one or more control units or devices that are operably connected to control operation of the receiver assembly. The controller includes and/or is connected with the memory, which stores program instructions (e.g., software) that are executed by the one or more processors to perform the operations of the receiver assembly described herein.

The communication device can represent hardware that communicates data signals via conductive pathways and/or wirelessly. For example, the communication device can represent modems, transceivers, antennas, or the like. The communication device can receive event signals in the form of electromagnetic signals. The electromagnetic signals may be radio frequency signals, optical signals, or the like. The electromagnetic signals may be communicated via a conductive pathway or wirelessly. For example, the electromagnetic signals may be wireless RF signals, RF signals via an RF cable, wireless optical signals, and/or optical signals via a fiber optic cable. In an example, the event signal may be an RF or optical signal that is generated by a sensor or switch device on another vehicle in the vehicle system in response to detecting the source of an event or detecting an unplanned brake application that starts at the source of the event. For example, a sensor may detect a leak in a brake pipe, a defective brake valve, an actuation of brakes that is unplanned (e.g., not selected by a human operator or trip planner system), or the like. The receipt of the electromagnetic signals by the communication device may be time-stamped and used to determine the location of the source of the event along the vehicle system. The assembly controller may utilize the communication device to send messages to other devices. For example, the assembly controller may communicate detection messages to a system controller of the location determining system, where the detection messages include one or more times that the receiver assembly received a signal indicative of an event.

The one or more sensors of the receiver assembly monitor one or more parameters of the vehicle on which the receiver assembly is installed. The sensor(s) can be used to receive an event signal that is in the form of a pneumatic signal, a hydraulic signal, and audio signal, or the like. The receipt of the such signals by the sensor(s) may be time-stamped and used to determine the location of the source of the event along the vehicle system. In an embodiment, at least one of the sensors monitors a brake system 116 of the vehicle on which the receiver assembly is installed. The brake system may include a conduit 102. The conduit may be a pipe, tube, hose, or the like. The conduit may be part of a brake pipe extending across multiple vehicles along a length of the vehicle system. The brake system may be an air brake system that includes pneumatically-actuated friction brakes. The sensor(s) may include a pressure sensor 104 that measures pressure in the conduit. In an embodiment, the event signal may be a pneumatic signal that represents a change in the pressure within the conduit, and the pressure sensor may receive the pneumatic signal by detecting the pressure change. For example, the pressure sensor may detect a pressure drop that represents the pneumatic signal and is indicative of a brake application. The brake application may be an unplanned brake application that is responsive to a leak in the brake pipe, a faulty brake valve, or another defect, at an unknown location along the length of the vehicle system. Optionally, the sensor(s) may monitor one or more other types of brake systems, such as hydraulic and/or regenerative, either instead of or in addition to monitoring an air brake system. Optionally, the sensors may include position sensors, audio sensors, proximity sensors, switch activation sensors, and/or the like.

The clock device can track passage of time. The assembly controller can determine a time at which the event signal is received by the receiver assembly from the clock device. For example, upon receiving an event signal (e.g., detecting a pressure change in the conduit that is at least a threshold amount, receiving an RF or optical signal, etc.), the assembly controller may use the clock device to time-stamp the moment at which the receiver assembly receives the event signal. The clock device may be synchronized with the clock devices on other receiver assemblies onboard the vehicle system. For example, the clock device may be calibrated based on a reference time. The reference time may be provided by a master clock, such as the master clock 206 shown in FIG. 3. The assembly controller may store the time at which an event signal is received in the memory and/or communicate the time to the system controller via the communication device.

Figure 3:
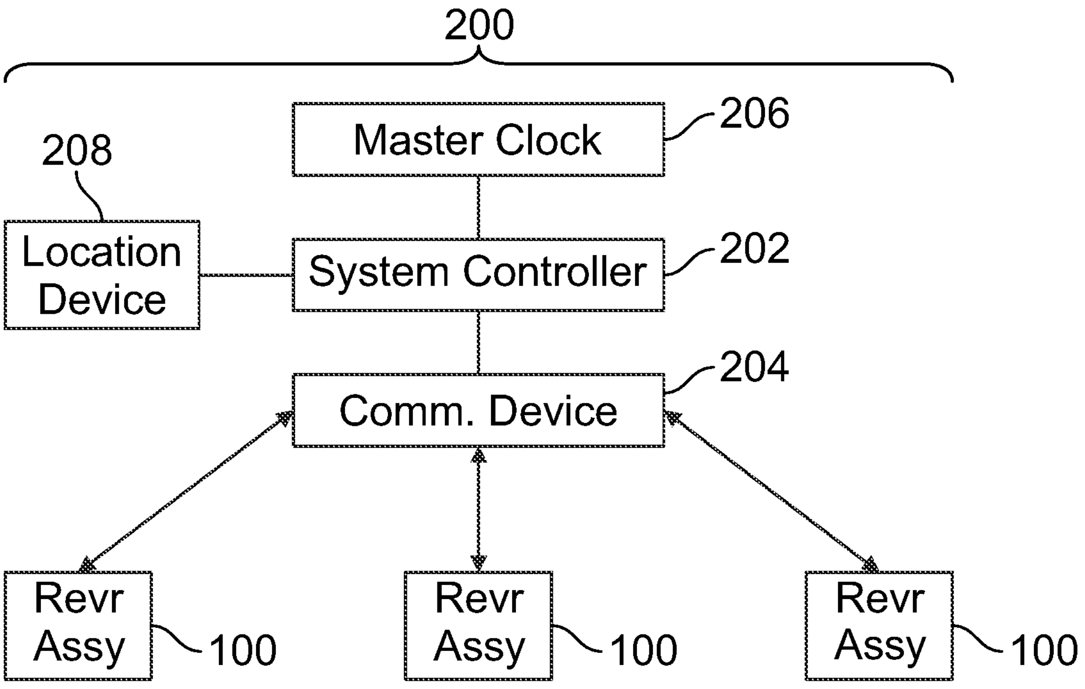
FIG. 3 is a block diagram of the location determining system according to an embodiment.

FIG. 3 is a block diagram of a location determining system 200 according to an embodiment. The location determining system may be integrated on a vehicle system. For example, the location determining system in FIG. 3 may represent location determining system shown in FIG. 1. The location determining system includes multiple receiver assemblies 100 of the type shown in FIG. 2. Three receiver assemblies are shown in FIG. 3, but the location determining system may include only two or at least four receiver assemblies in other embodiments. The location determining system includes a communication device 204 (e.g., a system communication device) that is communicatively connected to the receiver assemblies. The system may include a system controller 202 that is operatively connected to the system communication device. The system may include a master clock 206. The master clock may be a single source clock device. The master clock may provide a reference time that is used to synchronize the clock devices of the individual receiver assemblies. The master clock may utilize a global navigation satellite system (GNSS), such as GPS, to determine the reference time.

The system controller represents hardware circuitry that includes and/or is connected with one or more processors (e.g., one or more microprocessors, integrated circuits, microcontrollers, field programmable gate arrays, etc.). The system controller may represent one or more control units or devices that are operably connected to control operation of the location determining system. The system controller includes and/or is connected with a tangible and non-transitory computer readable storage medium, or computer memory, which stores program instructions (e.g., software) that are executed by the one or more processors to perform the operations of the location determining system described herein. The system communication device can represent hardware that communicates data signals via conductive pathways and/or wirelessly. For example, the system communication device can represent modems, transceivers, antennas, or the like.

In an embodiment, the receiver assemblies determine respective times at which the receiver assemblies received a signal responsive to an event occurring on the vehicle system between the receiver assemblies and communicate the times to the system communication device via the communication devices of the receiver assemblies. The system controller receives the times from the system communication device and identifies a section of the vehicle system that includes a source of the event based on the times and a distance between at least two of the receiver assemblies. The section of the vehicle system that is identified may be a single vehicle in the vehicle system (e.g., Car 3 in FIG. 1), a gap between at least two vehicles in the vehicle system (e.g., the space between Car 3 and Car 4), or a single location in the vehicle system that is smaller than a single vehicle. The single location may be more precise than identifying a single vehicle, and may include identifying a portion of the vehicle along the length of that vehicle. The single location may be a front half, rear half, a specific component or assembly (e.g., front axle, front brake mechanism, etc.), or the like. In another example, the section of the vehicle system may refer to a sub-set of multiple vehicles, such as a front consist of multiple propulsion-generating vehicles. The identification of the section which includes the anticipated source of the event can be used to direct the attention of maintenance personnel. The maintenance personnel can examine the identified section of the vehicle system first, without examining other portions of the vehicle system, which can drastically reduce the time and effort to remediate the event and allow the vehicle system to continue traveling on the route.

In an embodiment, the event signal is a pneumatic signal. For example, the pneumatic signal may represent a change in pressure within a brake pipe. The event could be a leak that causes the change in pressure. Optionally, the event may be an unplanned brake application caused by a leak or another defect. For example, the change in pressure that propagates at a pneumatic emergency propagation rate along the vehicle system could be attributable to an unplanned brake application that causes a pressure change by actuating air brakes. Each receiver assembly may receive the event signal by detecting, via the pressure sensor, the pressure change in the conduit. The pressure change that represents the signal may be a change that exceeds a threshold margin (e.g., amount) within a designated period of time. For example, the threshold margin may be a drop of at least 30 psi in no more than 10 seconds.

In another embodiment, the event signal is an electromagnetic signal. For example, a sensor or switch may be located proximate to the source of the event. The sensor may detect the event and/or the switch may be triggered by the event. In an example, actuation of a first brake during an unplanned brake application may be detected by a sensor and/or may trigger a switch, before the unplanned brake application is performed by other vehicles in the vehicle system. The sensor and/or switch may generate or trigger generation of an electromagnetic signal responsive to the event. The electromagnetic signal may be an RF signal, an optical signal, or the like. The sensor may be associated with a brake system, and may generate the electromagnetic signal. The electromagnetic signal may propagate along a length of the vehicle system to the receiver assemblies via an RF cable, a fiber optic line, through the air, or the like. The propagation rate of the medium that conveys the signal may be known and stored in the memory of the system controller.

The system controller may identify the section that includes the source of the event by inputting the received times as inputs into one or more equations, algorithms, mathematical models, machine learning algorithms, or the like. Another input is a distance between at least two of the receiver assemblies. The distance may be measured by a range sensor, estimated based on factors such as the number and type of vehicles between the two receiver assemblies, and/or the like. Values of the distance(s) between the receiver assemblies may be constants that are stored in the memory of the system controller. Optionally, the system controller may modify the stored distance values based on curvature of the route. For example, if the vehicle system in FIG. 1 is on a curve, the two receiver assemblies may be closer together than if the vehicle system is on a straight segment of the route. Upon determining, based on comparing location data of the vehicle system to a route map, for example, that the vehicle system is on a curved segment, the system controller may slightly reduce the value of the distance between the two receiver assemblies for use in identifying the section that includes the source of the event.

The clock device of one or more of the receiver assemblies may drift away from the time managed by the master clock device of the system controller. The system controller may require that the clock devices of the receiver assemblies be synchronized to the master clock or the same time reference. The system controller may periodically poll the receiver assemblies to determine whether one or more of the times needs to be adjusted, due to clock drift. For example, the system controller may send poll signals to the assembly controllers, and the assembly controllers may respond with response signals that include or represent the time of the clock devices of the respective receiver assemblies. The system controller can determine a difference between a time of the master clock device with the times of the clock devices as reported by the assembly controllers in the response signals. If the timestamp provided by one or more of the receiver assemblies is subject to clock drift, then one or more of the timestamps may need to be adjusted to ensure that the timestamps from the receiver assemblies can be accurately compared with each other. The system controller can adjust the time reported by the assembly controller by a determined amount of clock drift. For example, if the difference between the master clock and the clock device of a receiver assembly is +2 seconds (e.g., the time of the clock device is two seconds behind the master clock), the system controller can reduce the time reported by the clock device of the receiver assembly by two seconds. This process can ensure that the times reported by several receiver assemblies are synchronized to the same time reference (e.g., the time of the master clock).

The event signal may propagate in both leading and trailing directions from the source or root cause of the event. The relative times at which the receiver assemblies receive the event signal are used by the system controller to determine the location of the source of the event and the section of the vehicle system that includes that location. In an embodiment, the system controller may determine a respective distance from at least one of the receiver assemblies to the section the includes the source of the event (e.g., the location of the source of the event) based on the times, ratios between the receiver distances between the receiver assemblies and the section, and based on the distance between two of the receiver assemblies. For example, the location determining system according to at least one embodiment does not merely determine which receiver assembly detected an event signal first, and then identify the section of the vehicle system as a section that includes that receiver assembly. Rather, the location determining system may identify the source of the event as a section that is between at least two of the receiver assemblies based on both the times and the distance between the receiver assemblies.

In an example, the system controller may determine the section based on the equation $d_1=D*0.5/PR-\Delta t*PR$. The time difference ($\Delta t$) is the difference between a second time ($t_2$) at which the event signal reached the second receiver assembly and a first time ($t_1$) at which the event signal reached the first receiver assembly. The propagation rate (PR) is the rate at which the event signal propagates along the length of the vehicle system from the source to the receiver assemblies. The propagation rate may be a constant, known value. The distance (D) represents the distance between the first receiver assembly and the second receiver assembly. The distance ($d_1$) is the distance from the first receiver assembly to the source of the event (e.g., the section). The distance $d_1$ equals $D-d_2$, where $d_2$ is the distance from the second receiver assembly to the source of the event (e.g., the section). The system controller identifies the section including the source of the event as being a section that is the solved distance $d_1$ from the first receiver assembly (in the direction towards the second receiver assembly) and the solved distance $d_2$ from the second receiver assembly (in the direction towards the first receiver assembly).

In another example, considering that the event signal may propagate at the same rate in both directions, the speed=distance*time equation can be modified such that the distance*time in the leading direction equals the distance*time in the trailing direction, and the sum of these two distances equals the known distance between the two receiver assemblies that determined the times. More specifically, the system controller may determine the section by inputting the time at which the event signal reached the first receiver assembly ($t_1$) and the time at which the event signal reached the second receiver assembly ($t_2$) into the equation $d_1/t_1=d_2/t_2$. The variable $d_1$ can be substituted out for $D-d_2$ because $d_1+d_2-D$ as established above, to solve for $d_2$.

Optionally, if there are multiple receiver assemblies, the system controller may perform the same calculations on different pairs of the receiver assemblies. For example, the system controller may receive the time that an intermediate receiver assembly received the event signal. The intermediate receiver assembly may be disposed on a different vehicle than the first and second receiver assemblies and between the first and second receiver assemblies along the length of the vehicle system. The system controller may compare the times determined by the first and intermediate receiver assemblies, as well as the distance between the first and intermediate receiver assemblies, to identify a second section that includes the source of the event. The second section is expected to be the same or close to the section that is identified based on the times determined by the first and second receiver assemblies. The system controller may use the second section for confirmation and/or to increase the precision of the identified section by considering additional data points.

Based on the known locations of the receiver assemblies on the vehicle system, such as at the leading and trailing ends, the system controller can identify the section that includes the source of the event by determining the on-board location that is the distance $d_1$ from the first receiver assembly and/or the location that is the distance $d_2$ from the second receiver assembly. The system controller may consult a vehicle manifest to determine which specific vehicle or vehicles, or even which portion of a single vehicle, is located the determined distances from the receiver assemblies.

The system controller may communicate a notification message to an operator, a crew, a dispatch or control center, and/or the like, to notify the recipient about the section (or location) of the vehicle system that is identified to include the source of the event. The notification message may be communicated via the system communication device. For example, the system communication device may transmit or broadcast the notification message to a personal computing device of an operator, such as a smartphone, tablet computer, wearable computing device, or the like. The system controller may communicate the notification message to an onboard display device, such as a display in the cab that is viewable to an operator in the cab. The notification message may include additional information, such as a type of the event (e.g., unplanned brake application, leak in pneumatic line, etc.), an expected cause of the event, and/or the like. The notification message may be directly communicated to crew members that are tasked with inspecting the vehicle system and repairing any damaged components, to limit delay. The identification of the section enables the crew to move directly to the believed source of the event, skipping vehicles that are not in the identified section.

The location determining system optionally may include a location determining device 208 that is operably connected to the system controller. The location determining device may be disposed onboard the vehicle system. The location determining device may determine the respective location of the vehicle system along the route at different times. The location determining device can include a receiver, at least one antenna, and associated circuitry. A suitable location determining device may be a GNSS receiver (e.g., a global positioning system (GPS) receiver) that generates data indicative of a location (e.g., a three-dimensional positional coordinate) for the vehicle system within a global coordinate system based on signals received from satellites. In an alternative embodiment, the location determining device can determine the respective location based on other mechanisms, such as using signals received from wayside devices, by tracking the direction and distance traveled from a checkpoint location that has determined or assigned coordinates, from a dead reckoning system, or the like. The location determining device may generate location data that is provided to the system controller either periodically or on request.

In an embodiment, the system controller may use the identified section (e.g., location) of the vehicle system including the source of the event with the location data generated by the location determining device to determine a geographic location where the event occurred or is identified. For example, the system controller has determined the time and location, along the vehicle system, at which the event occurred. The location data tracks the location of the vehicle system relative to the surrounding environment over time. The system controller may determine the location of the vehicle system relative to the surrounding environment at that time, and then transitively determine a geographic location of that identified on-board location or section. For example, if the identified section is Car 3 in FIG. 1, the system controller can use the location data to determine the geographic location of Car 3 at the time that the event occurred or was detected or identified. The geographic location may be coordinate positional data, such as GPS data. The system controller may compare the geographic location to a map of the surrounding environment, such as a topographical map, to determine the geography at the place that Car 3 experienced the event. The system controller may flag that location or segment of the route for maintenance or inspection. For example, that geographic location may include a change in grade, a curve, a track switch, or the like, that may have caused the damage or fault experienced by Car 3. The notification message optionally may include the geographic location, such that a crew can be dispatched to inspect the route at that geographic location in an attempt to remedy any condition that could cause the event to occur in other vehicle systems traversing that geographic location in the future.

In an embodiment, the system controller may control movement of the vehicle system based at least in part on the identified section (e.g., location) of the source of the event. For example, the system controller may control a leading portion of the vehicle system differently than a trailing portion of the vehicle system. The leading portion and trailing portion are disposed on opposite sides of the source. For example, the leading portion extends from the identified section to the leading end of the vehicle system, and the trailing portion extends from the identified section to the trailing end. In an example, the system controller may differentiate a timing and/or a force of a first brake application by the leading portion relative to the timing and/or force of a second brake application by the trailing portion. For example, if the event is located closer to the leading end, the first receiver assembly that is closer to the leading end may receive the event signal before the second receiver assembly that is closer to the trailing end. If the leading portion were to apply the first brake application immediately upon receipt of the event signal, the leading portion of the vehicle system may brake before and/or with greater force than the trailing portion. In effect, the vehicle system may experience large compressive forces between the vehicles, which could damage the couplers and other components. The system controller may avoid this issue by temporarily delaying the leading portion from performing the first brake application so that the trailing portion can perform the second brake application at approximately the same time as the first brake application. Alternatively, the system controller may control the leading portion to perform the first brake application immediately upon receipt, but with a reduced brake force than the second brake application, at least initially, to limit the compressive forces between vehicles.

In an embodiment, the entire location determining system is disposed onboard the vehicle system. By being present onboard the vehicle system, the system controller can quickly generate control signals, such as to vary brake applications, before a pneumatic signal has time to propagate the length of the vehicle system. In an alternative embodiment, the system controller, system communication device, and master clock may be disposed offboard the vehicle system, and may communicate with the receiver assemblies that are onboard.

Figure 4:
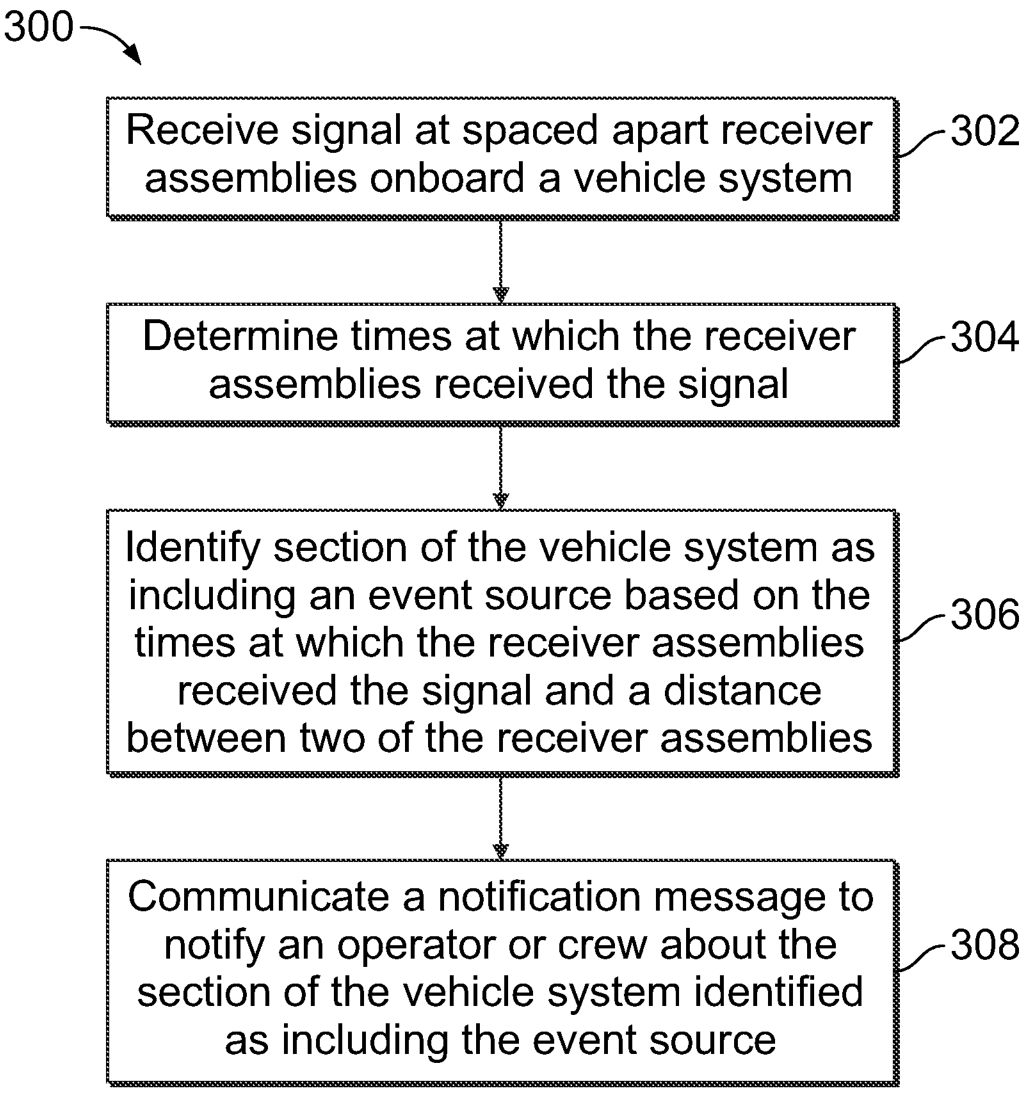
FIG. 4 is a flow chart of a method of identifying an event source location along the length of a vehicle system according to an embodiment.

FIG. 4 is a flow chart of a method 300 of identifying an event source location along the length of a vehicle system according to an embodiment. The method may be performed in whole or in part by the location determining system shown in FIG. 3. The method optionally may include more steps than shown, fewer steps than shown, and/or different steps than shown in FIG. 4. The order of the steps may be performed in any order that is practical, unless otherwise stated. At step 302, a signal is received at spaced apart receiver assemblies disposed onboard a vehicle system. The signal may be responsive to an event occurring on the vehicle system between the receiver assemblies. The event may be identified as an unplanned brake application of a brake system of the vehicle system.

At step 304, times at which the receiver assemblies received the signal are determined. The receiver assemblies may include clock devices that are synchronized. The assembly controller of each receiver assembly may time-stamp the receipt of the signal based on the clock device. The method may include receiving a reference time from a single clock source (e.g., master clock device), and the times may be determined based on the reference time.

At step 306, a section of the vehicle system that includes a source of the event is identified based on the times at which the receiver assemblies received the signal and a distance between at least two of the receiver assemblies. The section of the vehicle system that includes the source may be identified based on the times, based on ratios between receiver distances between the receiver assemblies and the section, and based on the distance between the at least two receiver assemblies.

At step 308, a notification message is generated and communicated to notify an operator about the section of the vehicle system that is identified as including the source of the event. The notification message may be communicated by a system communication device to a computing device (e.g., a smartphone) of an operator or crew, to a display device in a cab of the vehicle system, to a remote (e.g., off-board) control center, and/or the like.

Optionally, the method may include differentiating between at least one of a timing or a force of a first brake application by a leading portion of the vehicle system and a second brake application by a trailing portion of the vehicle system based on a location of the section identified to include the source of the event. For example, the method may include identifying the section of the vehicle system that includes the source as being closer to a leading end of the vehicle system than a trailing end of the vehicle system. In response to identifying the section being closer to the leading end, the method may include controlling the trailing portion of the vehicle system to apply the second brake application earlier and/or with more force than the first brake application applied by the leading portion of the vehicle system, to reduce compressive forces between vehicles when slowing.

In an embodiment, a location determining system includes receiver assemblies and a controller that includes one or more processors. The receiver assemblies may be disposed onboard a vehicle system and spaced apart from each other along a length of the vehicle system. The receiver assemblies may receive a signal responsive to an event occurring on the vehicle system between the receiver assemblies, and may determine times at which the receiver assemblies received the signal. The controller may identify a section of the vehicle system that includes a source of the event based at least on the times at which the receiver assemblies received the signal and a distance between two of the receiver assemblies.

The receiver assemblies may receive the signal as a pneumatic signal. The pneumatic signal may represent a change in pressure within a brake pipe. Alternatively, the receiver assemblies may receive the signal as an electromagnetic signal. The electromagnetic signal may be generated by a sensor device associated with a brake system of the vehicle system. The electromagnetic signal may be received via a fiber optic line from the sensor device associated with the brake system. The receiver assemblies may determine the times at which the receiver assemblies received the signal based on a reference time provided by a single source clock device.

The controller may identify the section of the vehicle system as a single vehicle in the vehicle system, a gap between at least two vehicles in the vehicle system, or a location on the single vehicle. The controller may identify the source of the event as a leak in a conduit of a brake system. Optionally, the controller may identify the section of the vehicle system that includes the source based on the times, ratios of different receiver distances, and the distance between the two receiver assemblies. Each of the different receiver distances defined between a corresponding one of the receiver assemblies and the section that includes the source of the event. The controller may identify the event as an unplanned brake application of a brake system of the vehicle system.

The controller may differentiate a timing and/or force between a first brake application by a leading portion of the vehicle system and a second brake application by a trailing portion of the vehicle system based on a location of the section that includes the source of the event. The leading portion and the trailing portion may be disposed on opposite sides of the source of the event. The controller may determine that the section of the vehicle system that includes the source is closer to a leading end of the vehicle system than a trailing end of the vehicle system. In response to that determination, the controller may control the trailing portion of the vehicle system to apply the second brake application earlier and/or with more force than the first brake application applied by the leading portion of the vehicle system.

A first receiver assembly of the receiver assemblies may be located closer to a leading end of the vehicle system, and a second receiver assembly of the receiver assemblies may be located closer to a trailing end of the vehicle system. The first receiver assembly may be onboard a first vehicle of the vehicle system closer to the leading end of the vehicle system, and the second receiver assembly may be onboard a second vehicle of the vehicle system that is closer to the trailing end of the vehicle system. The receiver assemblies may include at least one intermediate receiver assembly configured to be onboard an intermediate vehicle located between the first vehicle and the second vehicle in the vehicle system.

The controller may communicate a notification message via a communication device to a computing device of an operator to notify the operator about the section of the vehicle system that is identified to include the source of the event. The system may include a location determining device disposed onboard the vehicle system to generate location data of the vehicle system. The controller may determine a geographic location at which the event occurred or is identified based on the location data and the section of the vehicle system that includes the source of the event.

In an embodiment, a method for determining an event source location includes receiving a signal at spaced apart receiver assemblies disposed onboard a vehicle system. The signal may be received responsive to an event occurring on the vehicle system between the receiver assemblies. The method may include determining times at which the receiver assemblies received the signal, and identifying a section of the vehicle system that includes a source of the event based on the times at which the receiver assemblies received the signal and a distance between at least two of the receiver assemblies.

The method may include receiving a reference time from a single clock source. The times at which the receiver assemblies received the signal may be determined based on the reference time. The section of the vehicle system that includes the source may be identified based on the times, based on ratios between receiver distances between the receiver assemblies and the section, and based on the distance between the at least two receiver assemblies. The event may be identified as an unplanned brake application of a brake system of the vehicle system. The method may include differentiating between a timing and/or force of a first brake application by a leading portion of the vehicle system and a second brake application by a trailing portion of the vehicle system based on a location of the section identified to include the source of the event. The leading portion and the trailing portion may be disposed on opposite sides of the source. The method may include identifying the section of the vehicle system that includes the source as being closer to a leading end of the vehicle system than a trailing end of the vehicle system. In response to identifying that the section with the source is closer to the leading end than the trailing end, the method may include controlling the trailing portion of the vehicle system to apply the second brake application earlier and/or with more force than the first brake application applied by the leading portion of the vehicle system.

In an embodiment, a location determining system includes receiver assemblies and a controller that has one or more processors. The receiver assemblies may be disposed onboard different vehicles of a multi-vehicle system having a brake system. The receiver assemblies may receive a pneumatic signal and/or an electromagnetic signal indicative of a pressure change event of the brake system. Each of the receiver assemblies may determine a respective time at which the one or more of the pneumatic signal or the electromagnetic signal is received by the receiver assembly. The controller may identify a location of the pressure change event in the brake system based on the respective times at which the receiver assemblies received the one or more of the pneumatic signal or the electromagnetic signal and based on a distance between the receiver assemblies.

The controller may identify the location of the pressure change event based on ratios between a receiver distance between each of the receiver assemblies and the location. The pressure change event may include a brake application of the vehicle system. The controller may identify a difference between timings of the brake application between (a) a first section of the vehicle system that is between the location of the pressure change event and a leading end of the vehicle system and (b) a second section of the vehicle system that is between the location of the pressure change event and a trailing end of the vehicle system. The controller may identify a difference between braking forces of the brake application between (a) a first section of the vehicle system that is between the location of the pressure change event and a leading end of the vehicle system and (b) a second section of the vehicle system that is between the location of the pressure change event and a trailing end of the vehicle system. The controller may control braking of the first section and the second section differently for one or more subsequent brake applications based on the difference between timings, the difference between braking forces, or both the difference between timings and the difference between braking forces.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like. For example, the controller of the control system described herein may use machine learning to enable determining the target storage amount of electrical energy to store in the energy storage device during the charge operation to achieve the performance target and/or to determine the movement and/or timing characteristics of the vehicle to achieve the determine target storage amount of electrical energy.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms “processor” and “computer,” and related terms, e.g., “processing device,” “computing device,” and “controller” may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term “non-transitory computer-readable media” represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

a sensor configured to generate a propagating signal responsive to an event occurring on a vehicle system;

receiver assemblies configured to be disposed onboard the vehicle system and spaced apart from each other along a length of the vehicle system, the receiver assemblies configured to receive the propagating signal generated by the sensor responsive to an event occurring on the vehicle system between the receiver assemblies, each of the receiver assemblies configured to generate a timestamp indicative of a time at which the receiver assembly received the signal; and a controller comprising one or more processors, the controller configured to identify a section of the vehicle system that includes a source of the event based at least on the timestamps indicative of the time at which each receiver assembly received the signal and a distance between the receiver assemblies.

2. The system of claim 1, wherein the receiver assemblies are configured to receive the signal as a pneumatic signal that represents a change in pressure within a brake pipe.

3. The system of claim 1, wherein the receiver assemblies are configured to receive the signal as an electromagnetic signal that is generated by a sensor device associated with a brake system of the vehicle system.

4. The system of claim 3, wherein the receiver assemblies are configured to receive the electromagnetic signal via a fiber optic line from the sensor device.

5. The system of claim 1, wherein the controller is configured to identify the section of the vehicle system as a single vehicle in the vehicle system, a gap between two vehicles in the vehicle system, or a location on the single vehicle.

6. The system of claim 1, wherein the controller is further configured to identify the section of the vehicle system that includes the source based on ratios of different receiver distances, each of the different receiver distances defined between a corresponding one of the receiver assemblies and the section that includes the source of the event.

7. The system of claim 1, wherein the controller is configured to identify the event as an unplanned brake application of a brake system of the vehicle system.

8. The system of claim 1, wherein the controller is configured to differentiate at least one of a timing or a force between a first brake application by a leading portion of the vehicle system and a second brake application by a trailing portion of the vehicle system based on a location of the section including the source of the event, wherein the leading portion and the trailing portion are disposed on opposite sides of the source of the event.

9. The system of claim 8, wherein the controller is configured to control the trailing portion to apply the second brake application at least one of earlier than or with more force than the first brake application applied by the leading portion responsive to determining that the section including the source of the event is closer to a leading end of the vehicle system than a trailing end of the vehicle system.

10. The system of claim 1, wherein a first receiver assembly of the receiver assemblies is configured to be onboard a first vehicle of the vehicle system and a second receiver assembly of the receiver assemblies is configured to be onboard a second vehicle of the vehicle system, the first vehicle disposed closer to a leading end of the vehicle system than to a trailing end of the vehicle system, the second vehicle disposed closer to the trailing end than to the leading end.

11. The system of claim 10, wherein an intermediate receiver assembly of the receiver assemblies is configured to be disposed onboard an intermediate vehicle located between the first vehicle and the second vehicle along a length of the vehicle system.

12. The system of claim 1, further comprising a location determining device global positioning system (GPS) receiver configured to be disposed onboard the vehicle system and configured to generate location data of the vehicle system, the controller configured to determine a geographic location at which the event occurred or is identified based on the location data and the section of the vehicle system that includes the source of the event.

* * * * *